United States Patent
Tian et al.

(10) Patent No.: US 10,659,695 B2
(45) Date of Patent: May 19, 2020

(54) GIMBAL CONTROL METHOD, GIMBAL CONTROL SYSTEM AND GIMBAL DEVICE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

(*) Notice: Subject to any disclaimer, the term of this patent is extended or adjusted under 35 U.S.C. 154(b) by 244 days.

(21) Appl. No.: 15/857,623

(22) Filed: Dec. 29, 2017

(65) Prior Publication Data
US 2018/0146126 A1 May 24, 2018

(30) Foreign Application Priority Data
Jan. 23, 2017 (CN) .......................... 2017 1 0075508

(51) Int. Cl.
H04N 5/232 (2006.01)
F16M 13/04 (2006.01)
G03B 17/56 (2006.01)
G02B 27/64 (2006.01)

(52) U.S. Cl.
CPC .......... H04N 5/2328 (2013.01); F16M 13/04 (2013.01); G02B 27/644 (2013.01); G03B 17/561 (2013.01); G02B 27/646 (2013.01)

(58) Field of Classification Search
CPC .................................................. H04N 5/2328
USPC ....................................................... 702/150
See application file for complete search history.

(56) References Cited

U.S. PATENT DOCUMENTS

| | | | |
|---|---|---|---|
| 2003/0014211 A1* | 1/2003 | Curey | G01C 19/28 702/150 |
| 2008/0167768 A1* | 7/2008 | Rubenstein | B63B 39/04 701/21 |
| 2011/0093250 A1* | 4/2011 | Lin | G01C 19/38 703/7 |
| 2014/0267778 A1* | 9/2014 | Webb | H04N 5/2328 348/169 |
| 2018/0135798 A1* | 5/2018 | Griffin | B64C 39/024 |
| 2018/0255247 A1* | 9/2018 | Ristroph | G02B 27/64 |

* cited by examiner

*Primary Examiner* — Ricky Ngon

(57) ABSTRACT

A gimbal control method, a gimbal control system and a gimbal device are provided. The method includes steps of: obtaining simulation position information, measurement position information and simulation angular velocity information of a Pitch axis of a gimbal in real-time; calculating a first position error between the simulation position information of the Pitch axis and the measurement position information of the Pitch axis; processing the first position error with proportional-derivative calculation, wherein the first position error is compensated with the simulation angular velocity information during the proportional-derivative calculation; and, according to a result of the proportional-derivative calculation after compensating, generating a first torque control instruction for controlling a torque of a Pitch axis motor, so as to enable the Pitch axis to reach a position corresponding to the simulation position information of the Pitch axis. According to the present invention, a brush motor is adopted.

10 Claims, 6 Drawing Sheets

GIMBAL CONTROL METHOD, GIMBAL CONTROL SYSTEM AND GIMBAL DEVICE

CROSS REFERENCE OF RELATED APPLICATION

The application claims priority under 35 U.S.C. 119(a-d) to CN 201710075508.1, filed Jan. 23, 2017.

BACKGROUND OF THE PRESENT INVENTION

Field of Invention

The present invention relates to a technical field of gimbal device, and more particularly to a gimbal control method, a gimbal control system and a gimbal device.

Description of Related Arts

The available handheld gimbal in the market is mainly the direct current brushless gimbal. The direct current brushless gimbal has an advantage of low noise, but has a high cost, resulting in that the direct current brushless gimbal cannot be popularized during the marketization process.

Conventionally, in the aspect of tracking shooting, the brushless gimbal mainly depends on the camera for automatically tracking shooting or shooting with the fixed visual angle. When tracking, the brushless gimbal mainly tracks the heading angle, and the cost requirement thereof is relatively high. Moreover, during the tracking shooting process, the response sometimes is not timely. Thus, the brushless gimbal has the certain limitations. Because the shooting target or the visual angle range is required to be adjusted in real-time, the brushless gimbal has the certain limitations in the practicability aspect of many shooting fields. For example, if the target has a fast moving speed, the brushless gimbal may lose the target or cannot accurately track the target.

SUMMARY OF THE PRESENT INVENTION

An object of the present invention is to provide a gimbal control method, a gimbal control system and a gimbal device, so as to solve a problem that a shooting quality of a handheld gimbal is affected due to dithering, shaking or a fast moving speed of a target during a handheld operation process.

The present invention firstly provides a gimbal control method, comprising steps of:

obtaining simulation position information, measurement position information and simulation angular velocity information of a Pitch axis of a gimbal in real-time;

calculating a first position error between the simulation position information of the Pitch axis and the measurement position information of the Pitch axis;

processing the first position error with proportional-derivative calculation, wherein the first position error is compensated with the simulation angular velocity information during the proportional-derivative calculation;

according to a result of the proportional-derivative calculation after compensating, generating a first torque control instruction for controlling a torque of a Pitch axis motor, so as to enable the Pitch axis to reach a position corresponding to the simulation position information of the Pitch axis;

obtaining simulation position information, measurement position information and simulation angular velocity information of a Yaw axis of the gimbal in real-time;

calculating a second position error between the simulation position information of the Yaw axis and the measurement position information of the Yaw axis;

processing the second position error with the proportional-derivative calculation, wherein the second position error is compensated with the simulation angular velocity information during the proportional-derivative calculation; and according to a result of the proportional-derivative calculation after compensating, generating a second torque control instruction for controlling a torque of a Yaw axis motor, so as to enable the Yaw axis to reach a position corresponding to the simulation position information of the Yaw axis.

Preferably, the gimbal control method further comprises steps of:

obtaining measurement position information of a Roll axis of the gimbal in real-time;

calculating a third position error between corresponding position information of the Roll axis when a rotation angle of the Roll axis of the gimbal is 0° and the measurement position information of the Roll axis;

processing the third position error with proportional-integral-derivative calculation; and according to a result of the proportional-integral-derivative calculation, generating a third torque control instruction for controlling a torque of a Roll axis motor, so as to control the Roll axis of the gimbal to reset to a position where the rotation angle of the Roll axis is 0°.

Preferably, the step of obtaining the simulation position information and the measurement position information of the Pitch axis of the gimbal in real-time further comprises steps of:

obtaining information about accelerated velocities and angular velocities of three axes of the gimbal through being measured by a gyroscope;

calculating and obtaining the measurement position information of the Pitch axis according to the information about the accelerated velocities and the angular velocities of the three axes; and processing an angular velocity of the Pitch axis in the information about the accelerated velocities and the angular velocities of the three axes with integrating, and obtaining the simulation position information of the Pitch axis.

Preferably, the step of obtaining the simulation position information and the measurement position information of the Yaw axis of the gimbal in real-time further comprises steps of:

obtaining the information about the accelerated velocities and the angular velocities of the three axes through being measured by the gyroscope;

calculating and obtaining the measurement position information of the Yaw axis according to the information about the accelerated velocities and the angular velocities of the three axes; and processing an angular velocity of the Yaw axis in the information about the accelerated velocities and the angular velocities of the three axes with integrating, and obtaining the simulation position information of the Yaw axis.

Preferably, the step of obtaining the simulation angular velocity information of the Pitch axis of the gimbal in real-time further comprises steps of:

according to the first position error, processing the angular velocity of the Pitch axis, and obtaining the simulation angular velocity information of the Pitch axis.

Preferably, the step of obtaining the simulation angular velocity information of the Yaw axis of the gimbal in real-time further comprises steps of:

according to the second position error, processing the angular velocity of the Yaw axis, and obtaining the simulation angular velocity information of the Yaw axis.

Preferably, the step of obtaining the measurement position information of the Roll axis of the gimbal in real-time further comprises steps of:

obtaining an accelerated velocity and an angular velocity of the Roll axis through being measured by the gyroscope; and calculating and obtaining the measurement position information of the Roll axis according to the information about the accelerated velocities and the angular velocities of the three axes.

The present invention further provides a gimbal control system, comprising:

a processor, for obtaining simulation position information, measurement position information and simulation angular velocity information of a Pitch axis of a gimbal in real-time;

a first comparator, for calculating a first position error between the simulation position information of the Pitch axis and the measurement position information of the Pitch axis;

a first proportional-integral-derivative (PID) controller, for processing the first position error with proportional-derivative calculation, wherein: the first position error is compensated with the simulation angular velocity information of the Pitch axis during the proportional-derivative calculation; the first PID controller is further for generating a first torque control instruction for controlling a torque of a Pitch axis motor according to a result of the proportional-derivative calculation after compensating, so as to enable the Pitch axis to reach a position corresponding to the simulation position information of the Pitch axis;

wherein:

the processor is further for obtaining simulation position information, measurement position information and simulation angular velocity information of a Yaw axis of the gimbal in real-time; and the gimbal control system further comprises:

a second comparator, for calculating a second position error between the simulation position information of the Yaw axis and the measurement position information of the Yaw axis; and a second PID controller, for processing the second position error with the proportional-derivative calculation, wherein: the second position error is compensated with the simulation angular velocity information of the Yaw axis during the proportional-derivative calculation; the second PID controller is further for generating a second torque control instruction for controlling a torque of a Yaw axis motor according to a result of the proportional-derivative calculation after compensating, so as to enable the Yaw axis to reach a position corresponding to the simulation position information of the Yaw axis.

Preferably, the processor is further for obtaining measurement position information of a Roll axis of the gimbal in real-time; and the gimbal control system further comprises:

a third compensator, for calculating a third position error between corresponding position information of the Roll axis when a rotation angle of the Roll axis of the gimbal is 0° and the measurement position information of the Roll axis; and a third PID controller, for processing the third position error with proportional-integral-derivative calculation; wherein: the third PID controller is further for generating a third torque control instruction for controlling a torque of a Roll axis motor according to a result of the proportional-integral-derivative calculation, so as to control the Roll axis of the gimbal to reset to a position where the rotation angle of the Roll axis is 0°.

Preferably, the gimbal control system further comprises a gyroscope, for obtaining information about accelerated velocities and angular velocities of three axes of the gimbal through measuring;

wherein:

the processor is further for calculating and obtaining the measurement position information of the Pitch axis according to the information about the accelerated velocities and the angular velocities of the three axes;

the processor is further for processing an angular velocity of the Pitch axis in the information about the accelerated velocities and the angular velocities of the three axes with integrating, and obtaining the simulation position information of the Pitch axis;

the gyroscope is further for obtaining the information about the accelerated velocities and the angular velocities of the three axes of the gimbal through measuring;

the processor is further for calculating and obtaining the measurement position information of the Yaw axis according to the information about the accelerated velocities and the angular velocities of the three axes; and the processor is further for processing an angular velocity of the Yaw axis in the information about the accelerated velocities and the angular velocities of the three axes with integrating, and obtaining the simulation position information of the Yaw axis.

Preferably, the processor is further for processing the angular velocity of the Pitch axis according to the first position error, and obtaining the simulation angular velocity information of the Pitch axis; and the processor is further for processing the angular velocity of the Yaw axis according to the second position error, and obtaining the simulation angular velocity information of the Yaw axis.

Preferably, the gyroscope is further for obtaining the information about the accelerated velocities and the angular velocities of the three axes of the gimbal through measuring; and the processor is correspondingly further for calculating and obtaining the measurement position information of the Roll axis according to an accelerated velocity and an angular velocity of the Roll axis in the information about the accelerated velocities and the angular velocities of the three axes.

The present invention further provides a gimbal device with the above described gimbal control method or gimbal control system.

According to the gimbal control method, the gimbal control system and the gimbal device provided by the present invention, the direct current brush motor or the direct current brushless motor is adopted, so that the gimbal device has a smooth hand feeling during the process of manually adjusting the visual angle of the Pitch axis and/or the Yaw axis; moreover, the gimbal device has a good follow-up effect, so that the user can arbitrarily adjust the shooting visual angle of the gimbal device when shooting with the gimbal device provided by the present invention; and the gimbal device decreases a requirement of the user on the operation hand feeling. Under the premise that the Roll axis is kept horizontal, the gimbal device can further realize the omnidirectional attitude positioning and tracking control of the Pitch axis and the Yaw axis, especially the omnidirectional positioning and tracking shooting of the visual angle of the Pitch axis. Thus, the gimbal device provided by the present invention is applicable in various environments, has the strong practicability, and is not limited by the application environment.

The adjustment way of the gimbal device provided by the present invention is different from that of the conventional gimbal device. The gimbal control method and system provided by the present invention allow the user to manually adjust the gimbal device for shooting, and guarantee that the gimbal device has a good hand feeling when manually adjusting. When the user adjusts the shooting visual angle, the smoothness of the image is guaranteed, the hand feeling is smooth, and the certain inertial follow-up effect is ensured, so that the gimbal device has the same follow-up effect when manually tracking the visual angle and automatically tracking the visual angle. Therefore, the gimbal device not only meets the professional shooting requirements, but also brings the good shooting experience to the shutterbugs and common users.

BRIEF DESCRIPTION OF THE DRAWINGS

The preferred embodiment of the present invention is described with accompanying drawings as follows, so as to provide a better understanding of the present invention.

Through reading the following detailed description of the accompanying drawings about the nonrestrictive preferred embodiment, other features, objects and advantages of the present invention will become more apparent, wherein the same or similar reference character represents the same or similar feature.

DETAILED DESCRIPTION OF THE PREFERRED EMBODIMENT

Figure 1:
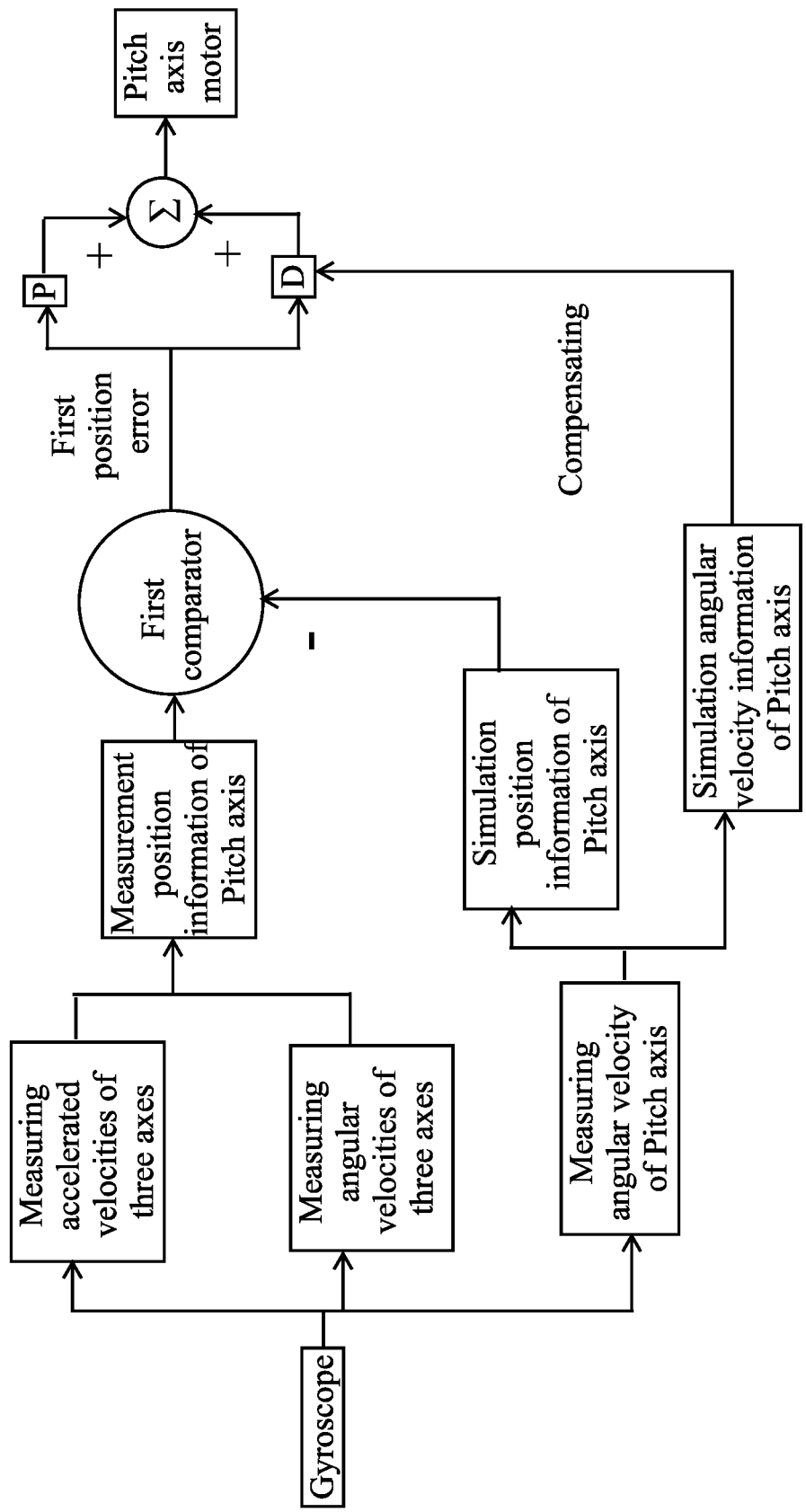
FIG. 1 is a module sketch view about controlling a Pitch axis motor according to a preferred embodiment of the present invention.

Features of various aspects and the preferred embodiment of the present invention are illustrated in detail as follows. Many specific details are provided in the following detailed description, for providing a comprehensive understanding of the present invention. For one skilled in the art, it is obvious that the present invention can be implemented with omitting some specific details. The following description of the preferred embodiment is merely for providing some examples of the present invention, so as to provide a better understanding of the present invention. In the description of the drawings and the preferred embodiment, the common structure and technology are not illustrated, so as to avoid a misunderstanding of the present invention. The same reference character in the drawings represents the same or similar structure, and thus the detailed description thereof is omitted. Moreover, the features, structures and characteristics which are descried below can be combined in one or more embodiments in any appropriate way. The nouns of locality in the following description are the directions shown in figures, not for limiting the specific structure of the present invention.

In the description of the present invention, it is noted that: unless otherwise expressly specified and limited, the terms such as "mount", "link" and "connect" should be understood in the broad sense. For example, the connection can be the fixed connection, detachable connection or integrated connection; and, the connection can also be the direct connection or the indirect connection through the medium. One skilled in the art can understand the specific meaning of the above terms in the present invention according to the specific condition.

The related technical terms in the preferred embodiment of the present invention are described as follows.

Gimbal means a gimbal with Pitch axis, Yaw axis and/or Roll axis controlled by motors.

Pitch axis is driven by a Pitch axis motor; in a three-axis coordinate system, the Pitch axis means Y-axis; and a rotation around the Pitch axis is represented by a pitch angle.

Yaw axis is driven by a Yaw axis motor; in the three-axis coordinate system, the Yaw axis means Z-axis; and a rotation around the Yaw axis is represented by a yaw angle.

Roll axis is driven by a Roll axis motor; in the three-axis coordinate system, the Roll axis means X-axis; and a rotation around the Roll axis is represented by a roll angle.

Simulation position information means position information obtained through processing an angular velocity with integrating.

Measurement position information means position information obtained through processing accelerated velocities and angular velocities of three axes of the gimbal with an inertial navigation algorithm.

The Pitch axis motor, the Yaw axis motor and the Roll axis motor can be a direct current brush motor, and can also be a direct current brushless motor.

According to the preferred embodiment of the present invention, a gimbal control method comprises steps of controlling a Pitch axis motor, a Yaw axis motor and a Roll axis motor of a gimbal.

Figure 4:
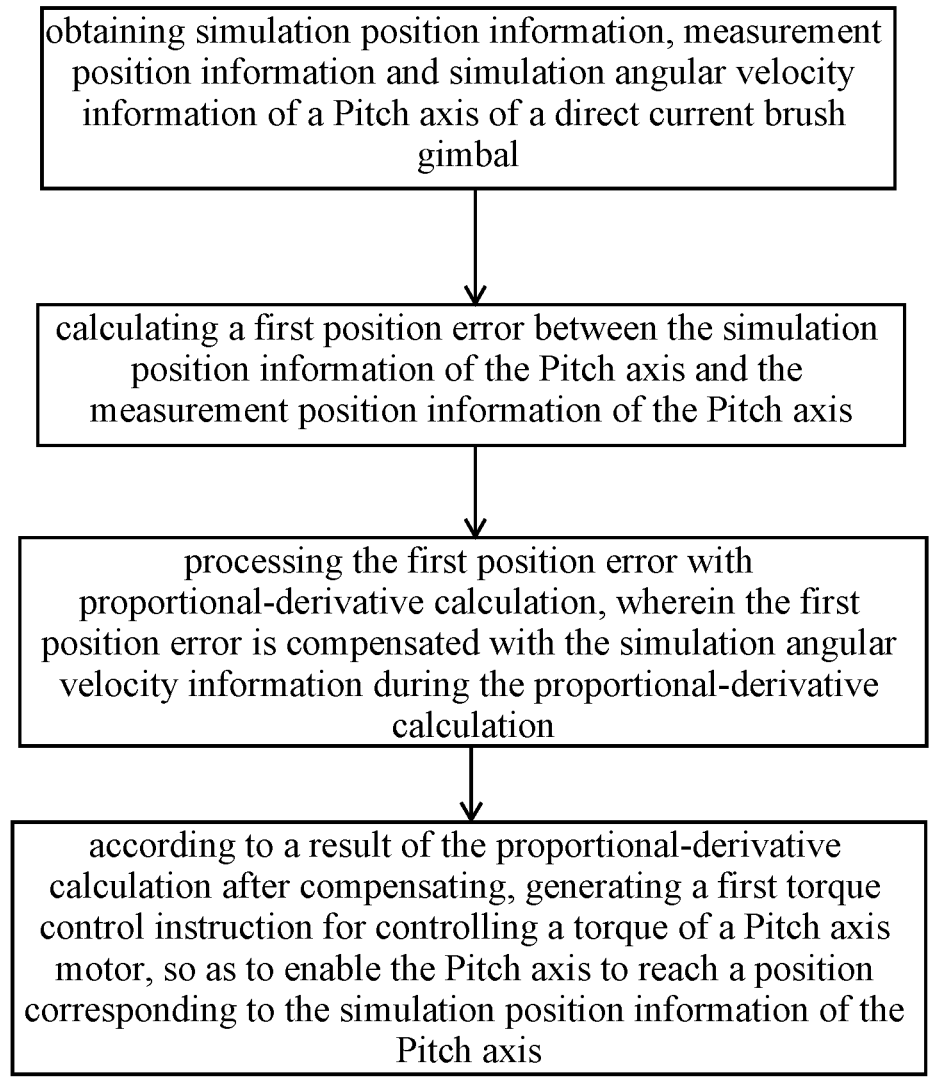
FIG. 4 is a flow chart about controlling the Pitch axis motor according to the preferred embodiment of the present invention.

Particularly, as shown in FIG. 1 and FIG. 4, a Pitch axis of the gimbal is controlled through following steps of:

obtaining simulation position information, measurement position information and simulation angular velocity information of the Pitch axis of the gimbal in real-time; calculating a first position error between the simulation position information of the Pitch axis and the measurement position information of the Pitch axis; processing the first position error with proportional-derivative calculation, wherein the first position error is compensated with the simulation angular velocity information during the proportional-derivative calculation; and according to a result of the proportional-derivative calculation after compensating, generating a first torque control instruction for controlling a torque of the Pitch axis motor, so as to enable the Pitch axis to reach a position corresponding to the simulation position information of the Pitch axis.

The step of obtaining the simulation position information and the measurement position information of the Pitch axis of the gimbal in real-time further comprises steps of:

obtaining information about accelerated velocities and angular velocities of three axes of the gimbal through being measured by a gyroscope;

calculating and obtaining the measurement position information of the Pitch axis according to the information about the accelerated velocities and the angular velocities of the three axes, wherein: after obtaining an accelerated velocity and an angular velocity of the Pitch axis, the measurement position information of the Pitch axis can be calculated according to the information about the accelerated velocities and the angular velocities of the three axes of the gimbal with an inertia navigation algorithm; the inertial navigation algorithm adopts a common inertial navigation algorithm such as a strapdown inertial navigation algorithm and is not described in detail herein; and processing the angular velocity of the Pitch axis with integrating, and obtaining the simulation position information of the Pitch axis, wherein: according to a time integral of the angular velocity, a rotation angle of the Pitch axis motor in a period of time is obtained; the rotation angle of the Pitch axis is processed with superposition from a zero position or a starting time, so as to obtain the simulation position information of the Pitch axis.

The step of obtaining the simulation angular velocity information of the Pitch axis of the gimbal in real-time further comprises steps of:

according to the first position error, processing the angular velocity of the Pitch axis with self-adaptive linear compensation, wherein: for example, according to the first position error, the angular velocity of the Pitch axis is multiplied by a coefficient K having a value range of [−2, 2], so as to compensate the first position error with the processed angular velocity; through compensating, the simulation position and the measurement position are kept consistent, so that the gimbal is guaranteed to have a better follow-up effect when the user adjusts a shooting visual angle, a dithering and shaking influence on the gimbal is decreased and the gimbal is guaranteed to stably follow a user action, thereby ensuring that the image is smooth and the hand feeling is smooth.

Figure 2:
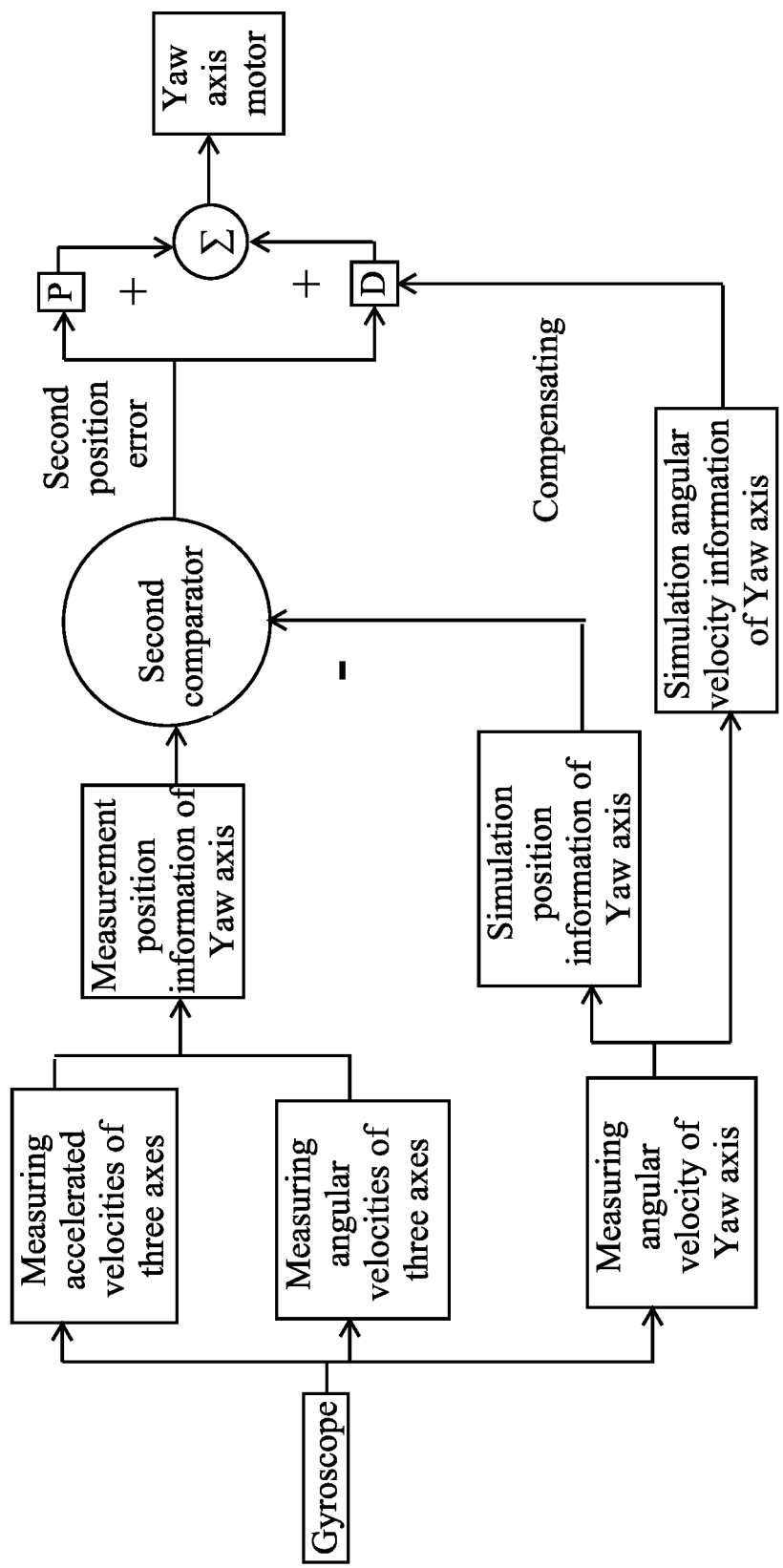
FIG. 2 is a module sketch view about controlling a Yaw axis motor according to the preferred embodiment of the present invention.
Figure 5:
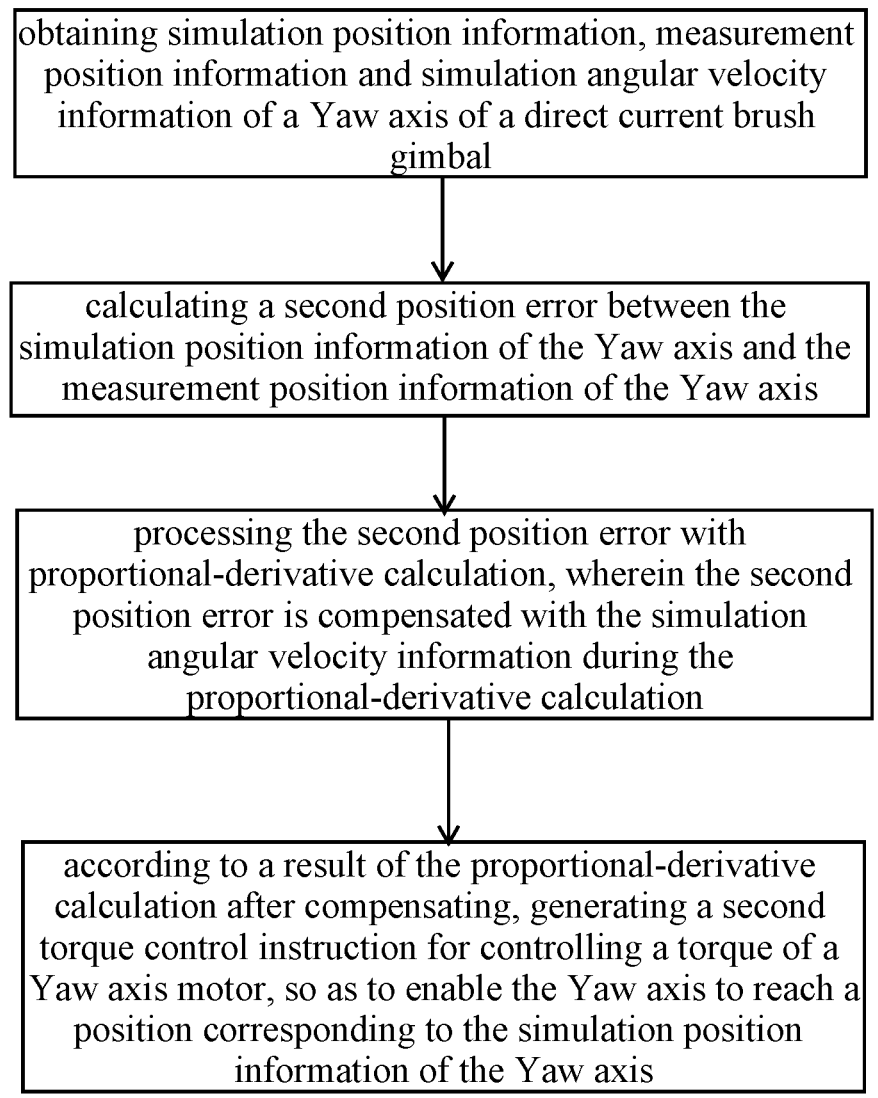
FIG. 5 is a flow chart about controlling the Yaw axis motor according to the preferred embodiment of the present invention.

As shown in FIG. 2 and FIG. 5, the Yaw axis of the gimbal is controlled through following steps of:

obtaining simulation position information, measurement position information and simulation angular velocity information of the Yaw axis of the gimbal in real-time; calculating a second position error between the simulation position information of the Yaw axis and the measurement position information of the Yaw axis; processing the second position error with the proportional-derivative calculation, wherein the second position error is compensated with the simulation angular velocity information during the proportional-derivative calculation; and according to a result of the proportional-derivative calculation after compensating, generating a second torque control instruction for controlling a torque of the Yaw axis motor, so as to enable the Yaw axis to reach a position corresponding to the simulation position information of the Yaw axis.

The step of obtaining the simulation position information and the measurement position information of the Yaw axis of the gimbal in real-time further comprises steps of:

obtaining the information about the accelerated velocities and the angular velocities of the three axes of the gimbal through being measured by the gyroscope;

calculating and obtaining the measurement position information of the Yaw axis according to the information about the accelerated velocities and the angular velocities of the three axes, wherein: after obtaining the information about the accelerated velocities and the angular velocities of the three axes, the measurement position information of the Yaw axis can be calculated with the inertia navigation algorithm; the inertial navigation algorithm adopts the common inertial navigation algorithm such as the strapdown inertial navigation algorithm and is not described in detail herein; and processing an angular velocity of the Yaw axis in the information about the accelerated velocities and the angular velocities of the three axes with integrating, and obtaining the simulation position information of the Yaw axis, wherein: according to a time integral of the angular velocity, a rotation angle of the Yaw axis motor in a period of time is obtained; the rotation angle of the Yaw axis is processed with superposition from a zero position or a starting time, so as to obtain the simulation position information of the Yaw axis.

The step of obtaining the simulation angular velocity information of the Yaw axis of the gimbal in real-time further comprises steps of:

according to the second position error, processing the angular velocity of the Yaw axis with self-adaptive linear compensation, wherein: for example, according to the second position error, the angular velocity of the Yaw axis is multiplied by a coefficient W having a value range of [−2, 2], so as to compensate the second position error with the processed angular velocity; through compensating, the simulation position and the measurement position are kept consistent, so that the gimbal is guaranteed to have the better follow-up effect when the user adjusts the shooting visual angle, the dithering and shaking influence on the gimbal is decreased and the gimbal is guaranteed to stably follow the user action, thereby ensuring that the image is smooth and the hand feeling is smooth.

The control method for the Pitch axis and the Yaw axis of the gimbal are respectively given as above. Based on the understanding of one skilled in the art, the control of the Pitch axis can realize the adjustment of the pitch visual angle of the gimbal device, and the control of the Yaw axis can realize the adjustment of the yaw visual angle of the gimbal device. During the implementation process, the control of two motors can be realized at the same time; and it is also feasible to merely control one motor while the other motor is controlled in other control way. Based on the understanding of one skilled in the art, when the control of the two motors is met at the same time, the control effect is better, namely the gimbal device can be controlled from the pitch visual angle and the yaw visual angle at the same time.

Figure 3:
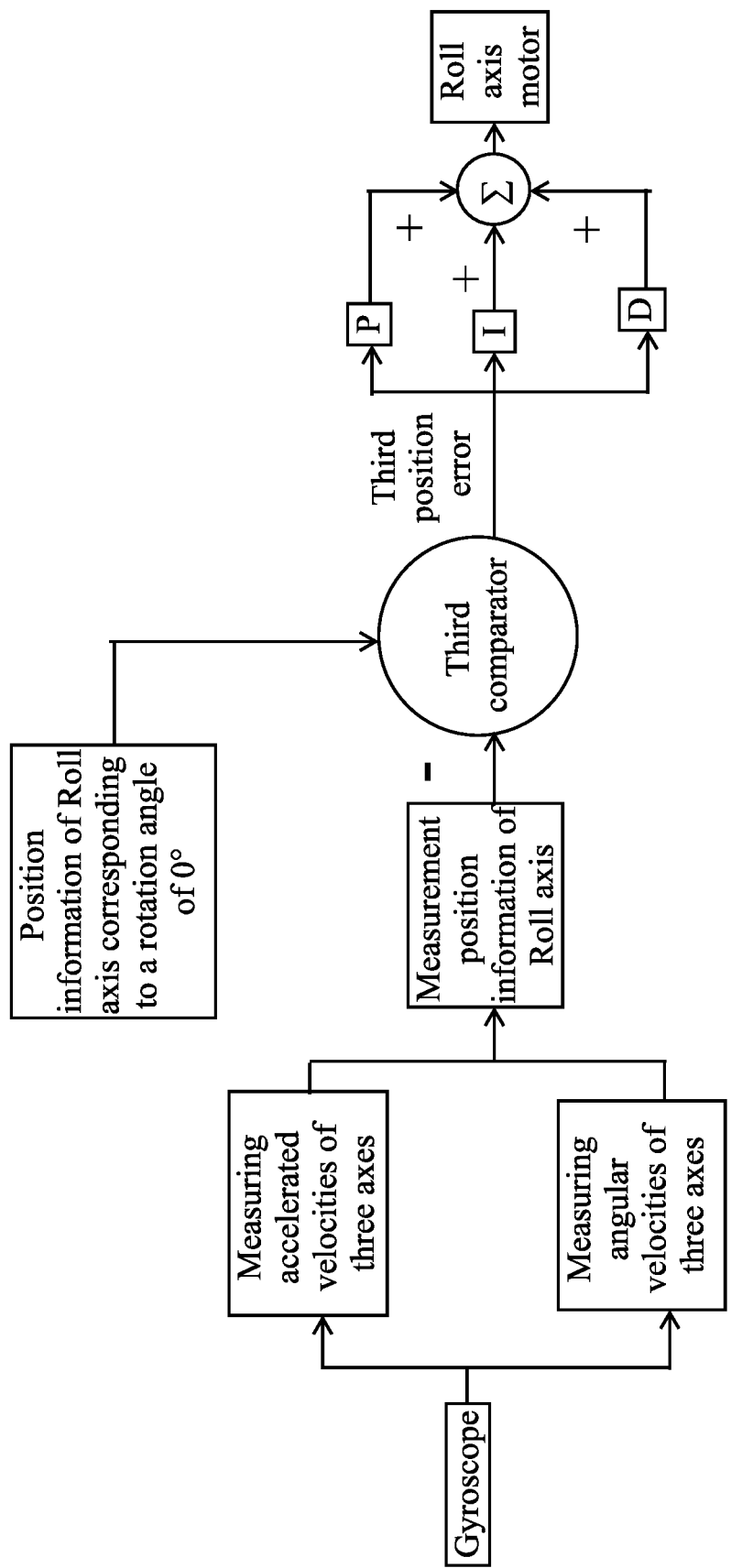
FIG. 3 is a module sketch view about controlling a Roll axis motor according to the preferred embodiment of the present invention.
Figure 6:
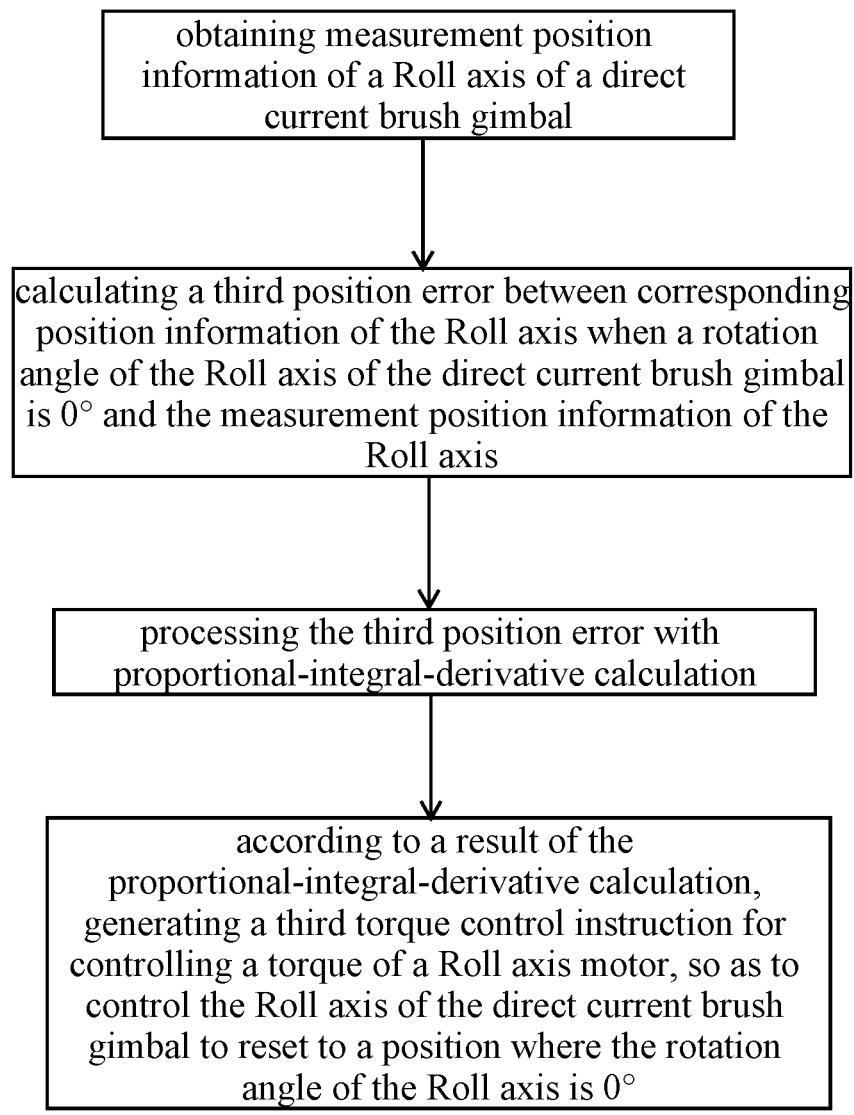
FIG. 6 is a flow chart about controlling the Roll axis motor according to the preferred embodiment of the present invention.

As shown in FIG. 3 and FIG. 6, the Roll axis of the gimbal is controlled through steps of:

obtaining measurement position information of the Roll axis of the gimbal in real-time;

calculating a third position error between corresponding position information of the Roll axis when a rotation angle of the Roll axis of the gimbal is 0° and the measurement position information of the Roll axis;

processing the third position error with proportional-integral-derivative calculation; and according to a result of the proportional-integral-derivative calculation, generating a third torque control instruction for controlling a torque of the Roll axis motor, so as to control the Roll axis of the gimbal to reset to a position where the rotation angle of the Roll axis is 0°.

When the rotation angle of the Roll axis of the gimbal is 0°, namely the Roll axis of the gimbal is in a horizontal position, the shooting angle of the gimbal device is guaranteed not to generate rolling, thereby obtaining the better shooting effect.

The step of obtaining the measurement position information of the Roll axis of the gimbal in real-time further comprises steps of:

obtaining the information about the accelerated velocities and the angular velocities of the three axes of the gimbal through being measured by the gyroscope; and according to the information about the accelerated velocities and the angular velocities of the three axes, calculating and obtaining the measurement position information of the Roll axis.

According to the preferred embodiment of the present invention, the control of the Roll axis of the gimbal is realized, so that the gimbal device will not roll when the pitch visual angle and the yaw visual angle of the gimbal device change, thereby keeping the video shot by the gimbal device horizontal.

According to the gimbal control method provided by the preferred embodiment of the present invention, the direct current brush motor or the direct current brushless motor is adopted, so that the gimbal device has a smooth hand feeling during the process of manually adjusting the visual angle of the Pitch axis and/or the Yaw axis; moreover, the gimbal device has a good follow-up effect, so that the user can arbitrarily adjust the shooting visual angle of the gimbal device when shooting with the gimbal device provided by the present invention; and the gimbal device decreases the requirement of the user on the operation hand feeling. Under the premise that the Roll axis is kept horizontal, the gimbal device can further realize the omnidirectional attitude positioning and tracking control of the Pitch axis and the Yaw axis, especially the omnidirectional positioning and tracking shooting of the visual angle of the Pitch axis. Thus, the gimbal device provided by the present invention is applicable in various environments, has the strong practicability, and is not limited by the application environment.

The adjustment way of the gimbal device provided by the present invention is different from that of the conventional gimbal device. The gimbal control method and system provided by the present invention allow the user to manually adjust the gimbal device for shooting, and guarantee that the gimbal device has a good hand feeling when manually adjusting. When the user adjusts the shooting visual angle, the smoothness of the image is guaranteed, the hand feeling is smooth, and the certain inertial follow-up effect is ensured, so that the gimbal device has the same follow-up effect when manually tracking the visual angle and automatically tracking the visual angle. Therefore, the gimbal device not only meets the professional shooting requirements, but also brings the good shooting experience to the shutterbugs and common users.

According to the preferred embodiment of the present invention, a gimbal control system is further provided, for controlling a Pitch axis motor, a Yaw axis motor and a Roll axis motor of a gimbal.

As shown in FIG. 1 and FIG. 4, a control subsystem for a Pitch axis of the gimbal comprises:

a processor, for obtaining simulation position information, measurement position information and simulation angular velocity information of the Pitch axis of the gimbal in real-time;

a first comparator, for calculating a first position error between the simulation position information of the Pitch axis and the measurement position information of the Pitch axis;

a first proportional-integral-derivative (PID) controller, for processing the first position error with proportional-derivative calculation, wherein: the first position error is compensated with the simulation angular velocity information of the Pitch axis during the proportional-derivative calculation; the first PID controller is further for generating a first torque control instruction for controlling a torque of the Pitch axis motor according to a result of the proportional-derivative calculation after compensating, so as to enable the Pitch axis to reach a position corresponding to the simulation position information of the Pitch axis.

Furthermore, the control subsystem for the Pitch axis of the gimbal further comprises:

a gyroscope, for obtaining information about accelerated velocities and angular velocities of three axes of the gimbal through measuring;

wherein:

the processor is further for calculating and obtaining the measurement position information of the Pitch axis according to the information about the accelerated velocities and the angular velocities of the three axes; wherein: after an accelerated velocity and an angular velocity of the Pitch axis are obtained, the measurement position information of the Pitch axis is calculated according to an inertial navigation algorithm; and the inertial navigation algorithm adopts a common inertial navigation algorithm such as a strapdown inertial navigation algorithm and is not described in detail herein;

the processor is further for processing the angular velocity of the Pitch axis in the information about the accelerated velocities and the angular velocities of the three axes with integrating, and obtaining the simulation position information of the Pitch axis; wherein: through a time integral of the angular velocity, a rotation angle of the Pitch axis in a period of time is obtained; the rotation angle of the Pitch axis is processed with superposition from a zero position or a starting time, so as to obtain the simulation position information of the Pitch axis.

Furthermore, the processor is further for processing the angular velocity of the Pitch axis with self-adaptive linear compensation according to the first position error. For example, according to the first position error, the angular velocity of the Pitch axis is multiplied by a coefficient K having a value range of [−2, 2], so as to compensate the first position error with the processed angular velocity; through compensating, the simulation position and the measurement position are kept consistent, so that the gimbal is guaranteed to have a better follow-up effect when the user adjusts a shooting visual angle, a dithering and shaking influence on the gimbal is decreased and the gimbal is guaranteed to stably follow a user action, thereby ensuring that the image is smooth and the hand feeling is smooth.

As shown in FIG. 2 and FIG. 5, a control subsystem for a Yaw axis of the gimbal comprises:

the processor, for obtaining simulation position information, measurement position information and simulation angular velocity information of the Yaw axis of the gimbal in real-time; and a second comparator, for calculating a second position error between the simulation position information of the Yaw axis and the measurement position information of the Yaw axis; and a second PID controller, for processing the second position error with the proportional-derivative calculation, wherein: the second position error is compensated with the simulation angular velocity information of the Yaw axis during the proportional-derivative calculation; the second PID controller is further for generating a second torque control instruction for controlling a torque of the Yaw axis motor according to a result of the proportional-derivative calculation after compensating, so as to enable the Yaw axis to reach a position corresponding to the simulation position information of the Yaw axis.

Furthermore, the control subsystem for the Yaw axis of the gimbal further comprises:

the gyroscope, for obtaining the information about the accelerated velocities and the angular velocities of the three axes of the gimbal through measuring;

wherein:

the processor is further for calculating and obtaining the measurement position information of the Yaw axis according to the information about the accelerated velocities and the angular velocities of the three axes; wherein: after an accelerated velocity and an angular velocity of the Yaw axis are obtained, the measurement position information of the Yaw axis is calculated according to the inertial navigation algorithm; and the inertial navigation algorithm adopts a common inertial navigation algorithm such as the strapdown inertial navigation algorithm and is not described in detail herein;

the processor is further for processing the angular velocity of the Yaw axis in the information about the accelerated velocities and the angular velocities of the three axes with integrating, and obtaining the simulation position information of the Yaw axis; wherein: through a time integral of the angular velocity, a rotation angle of the Yaw axis in a period of time is obtained; the rotation angle of the Yaw axis is processed with superposition from the zero position or the starting time, so as to obtain the simulation position information of the Yaw axis.

Furthermore, the processor is further for processing the angular velocity of the Yaw axis with the self-adaptive linear compensation according to the second position error. For example, according to the second position error, the angular velocity of the Yaw axis is multiplied by a coefficient W having a value range of $[-2, 2]$, so as to compensate the second position error with the processed angular velocity; through compensating, the simulation position and the measurement position are kept consistent, so that the gimbal is guaranteed to have the better follow-up effect when the user adjusts the shooting visual angle, the dithering and shaking influence on the gimbal is decreased and the gimbal is guaranteed to stably follow the user action, thereby ensuring that the image is smooth and the hand feeling is smooth.

According to the preferred embodiment of the present invention, the control of the Pitch axis motor and the Yaw axis motor of the gimbal are respectively given. Based on the understanding of one skilled in the art, the control of the Pitch axis motor can realize the adjustment of the pitch visual angle of the gimbal device, and the control of the Yaw axis motor can realize the adjustment of the yaw visual angle of the gimbal device. During the implementation process, the control of two motors can be realized at the same time; and it is also feasible to merely control one motor while the other motor is controlled in other control way. Based on the understanding of one skilled in the art, when the control of the two motors is met at the same time, the control effect is better, namely the gimbal device can be controlled from the pitch visual angle and the yaw visual angle at the same time.

As shown in FIG. 3 and FIG. 6, a control subsystem for the Roll axis motor of the gimbal comprises:

the processor, for obtaining measurement position information of the Roll axis of the gimbal in real-time; and a third compensator, for calculating a third position error between corresponding position information of the Roll axis when a rotation angle of the Roll axis of the gimbal is 0° and the measurement position information of the Roll axis; and a third PID controller, for processing the third position error with proportional-integral-derivative calculation; wherein: the third PID controller is further for generating a third torque control instruction for controlling a torque of the Roll axis motor according to a result of the proportional-integral-derivative calculation, so as to control the Roll axis of the gimbal to reset to a position where the rotation angle of the Roll axis is 0°.

When the rotation angle of the Roll axis of the gimbal is 0°, namely the Roll axis of the gimbal is in a horizontal position, the shooting angle of the gimbal device is guaranteed not to generate rolling, thereby obtaining the better shooting effect.

Furthermore, the gyroscope is further for obtaining the information about the accelerated velocities and the angular velocities of the three axes of the gimbal; and the processor is correspondingly further for calculating and obtaining the measurement position information of the Roll axis according to the information about the accelerated velocities and the angular velocities of the three axes.

According to the preferred embodiment of the present invention, the control of the Roll axis of the gimbal is realized, so that the gimbal device will not roll when the pitch visual angle and the yaw visual angle of the gimbal device change, thereby keeping the video shot by the gimbal device horizontal.

According to the gimbal control system provided by the preferred embodiment of the present invention, the direct current brush motor or the direct current brushless motor is adopted, so that the gimbal device has a smooth hand feeling during the process of manually adjusting the visual angle of the Pitch axis and/or the Yaw axis; moreover, the gimbal device has a good follow-up effect, so that the user can arbitrarily adjust the shooting visual angle of the gimbal device when shooting with the gimbal device provided by the present invention; and the gimbal device decreases the requirement of the user on the operation hand feeling. Under the premise that the Roll axis is kept horizontal, the gimbal device can further realize the omnidirectional attitude positioning and tracking control of the Pitch axis and the Yaw axis, especially the omnidirectional positioning and tracking shooting of the visual angle of the Pitch axis. Thus, the gimbal device provided by the present invention is applicable in various environments, has the strong practicability, and is not limited by the application environment.

The adjustment way of the gimbal device provided by the present invention is different from that of the conventional gimbal device. The gimbal control method and system provided by the present invention allow the user to manually adjust the gimbal device for shooting, and guarantee that the gimbal device has a good hand feeling when manually adjusting. When the user adjusts the shooting visual angle, the smoothness of the image is guaranteed, the hand feeling is smooth, and the certain inertial follow-up effect is ensured, so that the gimbal device has the same follow-up effect when manually tracking the visual angle and automatically tracking the visual angle. Therefore, the gimbal device not only meets the professional shooting requirements, but also brings the good shooting experience to the shutterbugs and common users.

According to the preferred embodiment of the present invention, a gimbal device is further provided with the above described gimbal control method or gimbal control system.

The present invention can be realized in other specified ways without departing from the spirit and basic characteristics of the present invention. The preferred embodiment of the present invention is exemplary only, not for limiting the present invention. The scope of the present invention is limited by the following claims, not by the above description and definition. Moreover, all of the changes encompassed in the scope of the content of the claims and the equivalents thereof are included in the scope of the present invention. Different technical features in different preferred embodiments can be combined to achieve the beneficial effect. Based on the drawings, specification and claims, one skilled in the art can understand and realize other embodiments having some changes compared with the disclosed preferred embodiment.

What is claimed is:

1. A gimbal control system, comprising:
   a processor, for obtaining simulation position information, measurement position information and simulation angular velocity information of a Pitch axis of a gimbal in real-time;
   a first comparator, for calculating a first position error between the simulation position information of the Pitch axis and the measurement position information of the Pitch axis;
   a first proportional-integral-derivative (PID) controller, for processing the first position error with proportional-derivative calculation, wherein: the first position error is compensated with the simulation angular velocity information of the Pitch axis during the proportional-derivative calculation; the first PID controller is further for generating a first torque control instruction for controlling a torque of a Pitch axis motor according to a result of the proportional-derivative calculation after compensating, so as to enable the Pitch axis to reach a position corresponding to the simulation position information of the Pitch axis;
   wherein:
   the processor is further for obtaining simulation position information, measurement position information and simulation angular velocity information of a Yaw axis of the gimbal in real-time; and
   the gimbal control system further comprises:
   a second comparator, for calculating a second position error between the simulation position information of the Yaw axis and the measurement position information of the Yaw axis; and
   a second PID controller, for processing the second position error with the proportional-derivative calculation, wherein: the second position error is compensated with the simulation angular velocity information of the Yaw axis during the proportional-derivative calculation; the second PID controller is further for generating a second torque control instruction for controlling a torque of a Yaw axis motor according to a result of the proportional-derivative calculation after compensating, so as to enable the Yaw axis to reach a position corresponding to the simulation position information of the Yaw axis.

2. The gimbal control system, as recited in claim 1, wherein:
   the processor is further for obtaining measurement position information of a Roll axis of the gimbal in real-time; and
   the gimbal control system further comprises:
   a third compensator, for calculating a third position error between corresponding position information of the Roll axis when a rotation angle of the Roll axis of the gimbal is 0° and the measurement position information of the Roll axis; and
   a third PID controller, for processing the third position error with proportional-integral-derivative calculation; wherein: the third PID controller is further for generating a third torque control instruction for controlling a torque of a Roll axis motor according to a result of the proportional-integral-derivative calculation, so as to control the Roll axis of the gimbal to reset to a position where the rotation angle of the Roll axis is 0°.

3. The gimbal control system, as recited in claim 2, further comprising:
   a gyroscope, for obtaining information about accelerated velocities and angular velocities of three axes of the gimbal through measuring;
   wherein:
   the processor is further for calculating and obtaining the measurement position information of the Pitch axis according to the information about the accelerated velocities and the angular velocities of the three axes;
   the processor is further for processing an angular velocity of the Pitch axis in the information about the accelerated velocities and the angular velocities of the three axes with integrating, and obtaining the simulation position information of the Pitch axis;
   the gyroscope is further for obtaining the information about the accelerated velocities and the angular velocities of the three axes of the gimbal through measuring;
   the processor is further for calculating and obtaining the measurement position information of the Yaw axis according to the information about the accelerated velocities and the angular velocities of the three axes; and
   the processor is further for processing an angular velocity of the Yaw axis in the information about the accelerated velocities and the angular velocities of the three axes with integrating, and obtaining the simulation position information of the Yaw axis.

4. The gimbal control system, as recited in claim 3, wherein:
   the processor is further for processing the angular velocity of the Pitch axis according to the first position error, and obtaining the simulation angular velocity information of the Pitch axis; and
   the processor is further for processing the angular velocity of the Yaw axis according to the second position error, and obtaining the simulation angular velocity information of the Yaw axis.

5. The gimbal control system, as recited in claim 3, wherein:
   the gyroscope is for obtaining the information about the accelerated velocities and the angular velocities of the three axes of the gimbal through measuring; and
   the processor is correspondingly further for calculating and obtaining the measurement position information of the Roll axis according to an accelerated velocity and an angular velocity of the Roll axis in the information about the accelerated velocities and the angular velocities of the three axes.

6. A gimbal device, comprising a gimbal control system as recited in claim 5.

7. The gimbal control system, as recited in claim 1, further comprising:
- a gyroscope, for obtaining information about accelerated velocities and angular velocities of three axes of the gimbal through measuring;

wherein:
- the processor is further for calculating and obtaining the measurement position information of the Pitch axis according to the information about the accelerated velocities and the angular velocities of the three axes;
- the processor is further for processing an angular velocity of the Pitch axis in the information about the accelerated velocities and the angular velocities of the three axes with integrating, and obtaining the simulation position information of the Pitch axis;
- the gyroscope is further for obtaining the information about the accelerated velocities and the angular velocities of the three axes of the gimbal through measuring;
- the processor is further for calculating and obtaining the measurement position information of the Yaw axis according to the information about the accelerated velocities and the angular velocities of the three axes; and
- the processor is further for processing an angular velocity of the Yaw axis in the information about the accelerated velocities and the angular velocities of the three axes with integrating, and obtaining the simulation position information of the Yaw axis.

8. The gimbal control system, as recited in claim 7, wherein:
- the processor is further for processing the angular velocity of the Pitch axis according to the first position error, and obtaining the simulation angular velocity information of the Pitch axis; and
- the processor is further for processing the angular velocity of the Yaw axis according to the second position error, and obtaining the simulation angular velocity information of the Yaw axis.

9. The gimbal control system, as recited in claim 7, wherein:
- the gyroscope is for obtaining the information about the accelerated velocities and the angular velocities of the three axes of the gimbal through measuring; and
- the processor is correspondingly further for calculating and obtaining the measurement position information of the Roll axis according to an accelerated velocity and an angular velocity of the Roll axis in the information about the accelerated velocities and the angular velocities of the three axes.

10. A gimbal device, comprising a gimbal control system as recited in claim 1.

* * * * *